United States Patent

Muzilla et al.

[11] Patent Number: 6,045,504
[45] Date of Patent: Apr. 4, 2000

[54] METHOD AND APPARATUS FOR POLYNOMIAL APPROXIMATION OF NONLINEAR OPERATIONS IN MEDICAL ULTRASOUND IMAGING

[76] Inventors: David John Muzilla, 216 Eagle Lake Ave., Mukwonago, Wis. 53149; Christopher J. Gilling, 266 Parkview Ct., Pewaukee, Wis. 53072; Xiao-Liang Xu, 1878 Ranchview Dr., Naperville, Ill. 60565

[21] Appl. No.: 09/094,338

[22] Filed: Jun. 9, 1998

[51] Int. Cl.[7] .................................................. A61B 8/00
[52] U.S. Cl. .......................................... 600/437; 600/438
[58] Field of Search ................................... 600/443, 447, 600/449, 444, 445; 178/916

[56] References Cited

U.S. PATENT DOCUMENTS

| | | | |
|---|---|---|---|
| 4,936,308 | 6/1990 | Fukukita et al. | 600/447 |
| 5,322,068 | 6/1994 | Theile et al. | 600/443 |
| 5,553,618 | 9/1996 | Suzuki et al. | 600/443 |

*Primary Examiner*—William E. Kamm
*Assistant Examiner*—Maulin Patel
*Attorney, Agent, or Firm*—Dennis M. Flaherty; Christian G. Cabou; Phyllis Y. Price

[57] ABSTRACT

Methods and apparatus for reducing the amount of computation required by nonlinear operations in medical ultrasound imaging by using lower-order polynomials to approximate the nonlinear functions. The method can be applied to envelope detection, phase detection, logarithmic compression and other nonlinear functions. Various pre-processing techniques (e.g., pre-reducing the data range and pre-dividing an entire range of the input into a number of subranges) can optionally be used prior to the polynomial approximation to achieve better accuracy, further reduce the polynomial order, and/or simplify the implementation.

29 Claims, 6 Drawing Sheets

1

METHOD AND APPARATUS FOR POLYNOMIAL APPROXIMATION OF NONLINEAR OPERATIONS IN MEDICAL ULTRASOUND IMAGING

FIELD OF THE INVENTION

This invention generally relates to ultrasound imaging of the human anatomy for the purpose of medical diagnosis. In particular, the invention relates to methods and apparatus for imaging human tissue by transmitting ultrasound waves into the tissue and then detecting ultrasound echoes reflected therefrom.

BACKGROUND OF THE INVENTION

Conventional ultrasound scanners create two-dimensional B-mode images of tissue in which the brightness of a pixel is based on the intensity of the echo return. Alternatively, in a color flow imaging mode, the movement of fluid (e.g., blood) or tissue can be imaged. Measurement of blood flow in the heart and vessels using the Doppler effect is well known. The phase shift of backscattered ultrasound waves may be used to measure the velocity of the backscatterers from tissue or blood. The Doppler shift may be displayed using different colors to represent speed and direction of flow. In power Doppler imaging, the power contained in the returned Doppler signal is displayed.

A conventional ultrasound imaging system is shown in FIG. 1. In this system, an ultrasound transducer array 2 is activated to transmit a series of multi-cycle tone bursts which are focused at the same transmit focal position with the same transmit characteristics. These tone bursts are fired at a pulse repetition frequency (PRF). A series of transmit firings focused at the same transmit focal position and having the same transmit characteristics is referred to as a "packet". Each transmit beam propagates through the object being scanned and is reflected by ultrasound scatterers in the object.

After each transmit firing, the echo signals detected by the transducer array elements are fed to respective receive channels of a beamformer 4. The receive beamformer tracks echoes under the direction of a master controller (not shown in FIG. 1). The receive beamformer imparts the proper receive focus time delays to the received echo signal and sums them to provide an echo signal which accurately indicates the total ultrasonic energy reflected from a succession of ranges corresponding to a particular transmit focal position. The beamformer also transforms the RF signal into its I/Q components by means of Hilbert bandpass filtering. The I/Q components are then summed in a receive summer (not shown in FIG. 1) for each transmit firing. Hilbert bandpass filtering can alternatively be performed after beam summation.

The output of the beamformer 4 is shifted in frequency by a demodulator 6. One way of achieving this is to multiply the input signal by a complex sinusoidal $e^{i2\pi f_d t}$, where $f_d$ is the frequency shift required. The downshifted I/Q components are then sent to a B-mode processor, which incorporates an envelope detector 20 for forming the envelope of the beam-summed receive signal by computing the quantity $(I^2+Q^2)^{1/2}$. The envelope of the signal undergoes some additional B-mode processing, such as logarithmic compression (block 22 in FIG. 1), to form display data which is output to the scan converter 14.

In general, the display data is converted by the scan converter 14 into X-Y format for video display. The scan-converted frames are passed to a video processor 16, which maps the video data to a gray-scale mapping for video display. The gray-scale image frames are then sent to the video monitor 18 for display.

The images displayed by the video monitor 18 are produced from an image frame of data in which each datum indicates the intensity or brightness of a respective pixel in the display. An image frame may, e.g., comprise a 256×256 data array in which each intensity datum is an 8-bit binary number that indicates pixel brightness. The brightness of each pixel on the display monitor 18 is continuously refreshed by reading the value of its corresponding element in the data array in a well-known manner. Each pixel has an intensity value which is a function of the backscatter cross section of a respective sample volume in response to interrogating ultrasonic pulses and the gray map employed.

In the color flow mode, the I/Q components are stored in a corner turner memory 8, whose purpose is to buffer data from possibly interleaved firings and output the data as vectors of points across firings at a given range cell. Data is received in "fast time", or sequentially down range (along a vector) for each firing. The output of the corner turner memory is reordered into "slow time", or sequentially by firing for each range cell. The resultant "slow time" I/Q signal samples are passed through respective wall filters 10.

Given the angle θ between the insonifying beam and the flow axis, the magnitude of the velocity vector can be determined by the standard Doppler equation:

$$v = cf_d/(2f_0 \cos \theta) \quad (1)$$

where c is the speed of sound in blood, $f_0$ is the transmit frequency and $f_d$ is the motion-induced Doppler frequency shift in the backscattered ultrasound signal.

The wall-filtered outputs are fed into a parameter estimator 12, which converts the range cell information into the intermediate autocorrelation parameters N, D, and R(0). N and D are the numerator and denominator for the autocorrelation equation, as shown below:

$$N = \sum_{i=1}^{M-1} (I_i Q_{i+1} - I_{i+1} Q_i) \quad (2)$$

$$D = \sum_{i=1}^{M-1} (I_i I_{i+1} + Q_i Q_{i+1}) \quad (3)$$

where $I_i$ and $Q_i$ are the input data for firing i, and M is the number of firings in the packet. R(0) is approximated as a finite sum over the number of firings in a packet, as follows:

$$R(0) = \sum_{i=1}^{M-1} \frac{(I_i^2 + Q_i^2 + I_{i+1}^2 + Q_{i+1}^2)}{2} \quad (4)$$

R(0) indicates the power in the returned ultrasound echoes.

A processor in parameter estimator 12 converts N and D into a magnitude and phase for each range cell. The equations used are as follows:

$$|R(T)| = \sqrt{N^2 + D^2} \quad (5)$$

$$\phi(R(T)) = \tan^{-1}\left[\frac{N}{D}\right] \quad (6)$$

The parameter estimator processes the magnitude and phase values into estimates of power, velocity and turbulence. The phase is used to calculate the mean Doppler frequency, which is proportional to the velocity as shown below; R(0) and |R(T)| (magnitude) are used to estimate the turbulence. The mean Doppler frequency in hertz is obtained from the phase of N and D and the pulse repetition time T:

$$\bar{f} = \frac{1}{2\pi T}\tan^{-1}\left[\frac{N}{D}\right] = \frac{1}{2\pi T}(\phi(R(T))) \qquad (7)$$

The mean velocity is calculated using the Doppler shift equation below. Since $\theta$, the angle between the flow direction and the sampling direction, is not known, $\cos\theta$ is assumed to be 1.0.

$$\bar{v} = \frac{\bar{f}}{f_0}\frac{c}{2\cos\theta} \qquad (8)$$

The parameter estimator 12 does not calculate the mean Doppler frequency as an intermediate output, but calculates $\bar{v}$ directly from the phase output of the processor using a lookup table. Typically the power estimates are compressed before scan conversion, e.g., using logarithmic compression (block 13 in FIG. 1)

The power or velocity estimates are sent to scan converter 14, which converts the color image frame data into X-Y format for video display. The scan-converted frames are passed to a video processor 16, which maps the video data to a display color map. The color flow image frames are then sent to the video monitor 18 for display.

In medical ultrasound systems it is necessary to apply envelope detection and/or phase detection to inphase (I) and quadrature (Q) signals, and to employ logarithmic compression or other similar types of compression for B/M-mode and color flow imaging. Because detection and compression are highly nonlinear, the associated operations require excessive computation, which makes real-time computation difficult. Therefore, to avoid performing excessive computation, it has been common in medical ultrasound to employ lookup tables in order to complete in real time the operations associated with envelope detection, phase detection and logarithmic compression. There is a need for alternative approaches to envelope detection, phase detection and compression, which reduce the amount of computation required.

SUMMARY OF THE INVENTION

The present invention encompasses methods and apparatus for reducing the amount of computation required by nonlinear operations in medical ultrasound imaging by using lower-order polynomials to approximate the nonlinear functions associated with detection and compression. The idea of implementing envelope detection, phase detection and logarithmic compression with polynomial approximation can be extended to other nonlinear operations in medical ultrasound systems, e.g., gray level mapping, parameter extraction and quantitative analysis. The polynomial approximation may be implemented in hardware, software or programmable processors. Additionally, various pre-processing techniques (e.g., pre-reducing the data range and pre-dividing an entire range of the input into a number of subranges) can optionally be used prior to the polynomial approximation to achieve better accuracy, further reduce the polynomial order, and/or simplify the implementation, and various post-processing techniques (e.g., frame averaging, median filtering and edge enhancement) can optionally be used subsequent to polynomial approximation.

DETAILED DESCRIPTION OF THE PREFERRED EMBODIMENTS

In medical ultrasound systems it is necessary to apply envelope detection and/or phase detection to inphase (I) and quadrature (Q) signals, and to employ logarithmic compression or other similar types of compression in B/M-mode and color flow imaging. The envelope detection is given by $$f = \sqrt{x} \qquad (9)$$

where $x=I^2+Q^2$. The phase detection is defined as $$\theta = \arctan\frac{Q}{I} \qquad (10)$$

The logarithmic compression is given by $$g=\log_{10} z \qquad (11)$$

where z denotes the data point to be compressed. A typical compression curve for the B mode can be described by, e.g., $h=\alpha_1 g+\alpha_2$, where $\alpha_1$ and $\alpha_2$ are constants depending on the selected dynamic range and its position for the compression, and h is the output of the compression. Equations (9)–(11) are highly nonlinear. The present invention uses lower-order polynomials to approximate the nonlinear functions associated with envelope detection, phase detection and compression.

Figure 1:
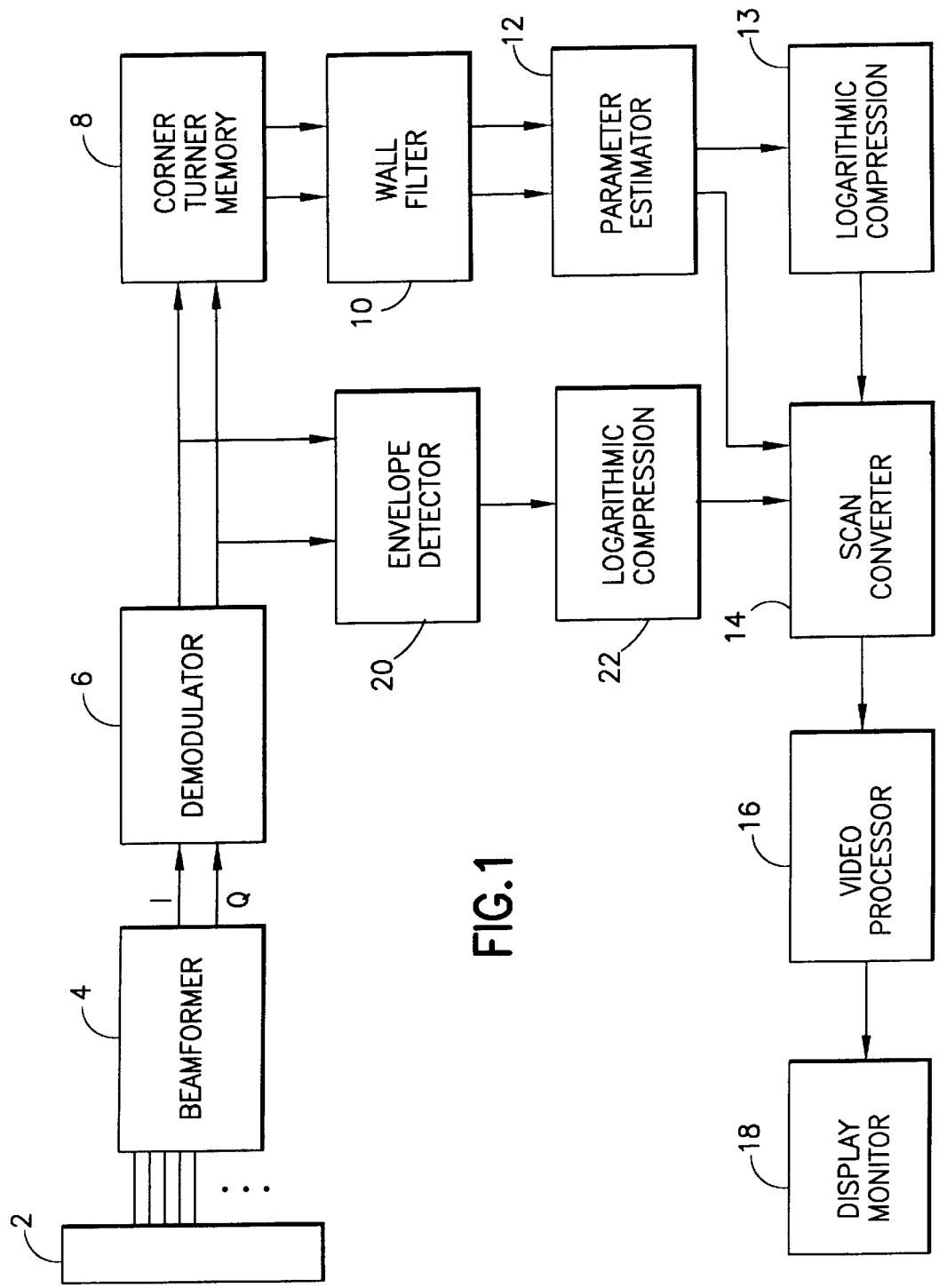
FIG. 1 is a block diagram showing the B mode and color flow mode signal processing chains for a conventional ultrasound imaging system.
Figure 2:
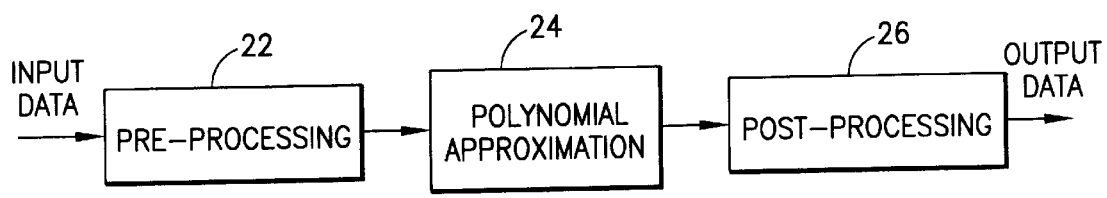
FIG. 2 is a block diagram showing a signal processing chain in accordance with the present invention for computing a nonlinear function in an ultrasound imaging system.

The invention can be described generically with reference to FIG. 2, which shows a pre-processing block 22, a polynomial approximation block 24 connected to receive the output of the pre-processing block 22, and a post-processing block 26 connected to process the polynomial approximation. The pre-processing techniques may include, e.g., pre-reducing the data range and predividing an entire range of the input into a number of subranges. The post-processing techniques may include, e.g., frame averaging, median filtering and edge enhancement. The means represented by blocks 22, 24 and 26 in FIG. 2 can be incorporated in the envelope detector 20, logarithmic compression means 22 or parameter estimator 12 shown in FIG. 1 or in any other portion of the ultrasound imaging system where a nonlinear operation is performed on the acquired imaging signal.

Based on the generic model shown in FIG. 2, many preferred embodiments for implementing envelope detection, phase detection and logarithmic compression can be developed, depending on the pre-processing scheme. Two preferred embodiments will be described below in detail for each nonlinear operation defined in Eqs. (9), (10) and (11).

Methods for Envelope Detection

Figure 3:
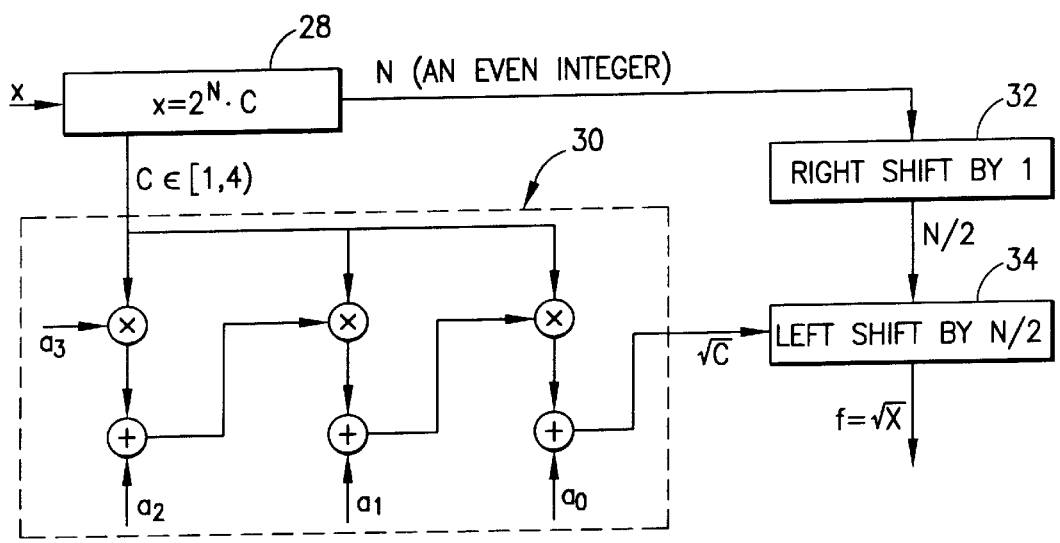
FIGS. 3 and 4 are block diagrams showing respective preferred embodiments of the invention utilizing polynomial approximation in envelope detection.

An implementation of Method 1 for performing envelope detection, i.e., for approximating $f=\sqrt{x}$, is shown in FIG. 3. In this implementation a polynomial order of 3 is assumed. Method 1 for performing envelope detection can be described as follows: (1) express x by $2^N \times C$ (block 28 in FIG. 3), where N is an even integer and $1 \leq C < 4$, both N and C being output from block 28 in binary form; (2) with predetermined coefficients $\{a_i\}$ of a polynomial that approximates $\sqrt{c}$, compute $$f_c = a_0 + a_1 C + \ldots + a_L C^L \quad (12)$$

where L is the order of the polynomial (the dashed box 30 in FIG. 3 represents approximation using a polynomial of order L=3); and (3) form $$f = 2^{N/2} f_c \quad (13)$$

The last calculation is preferably carried out by right shifting the binary number N by one bit to form N/2 (block 32 in FIG. 3) and then left shifting the binary number $f_c$ by N/2 (block 34 in FIG. 3). The reason for setting N to be an even integer is to eliminate a multiplication operation in implementing Eq. (13). Specifically, if N is an even integer, N/2 is an integer and thus Eq. (13) only requires a left-shift operation. When the computation time required for a fixed-point multiplication operation is comparable to that required for a shift operation, N and the range of C can be set in a different way, e.g., N is an integer and the range of C is [1, 2). Because the range of C in Eq. (12) is [1, 4), which is very small, a polynomial of order 2 or 3 will provide excellent approximation.

Figure 4:
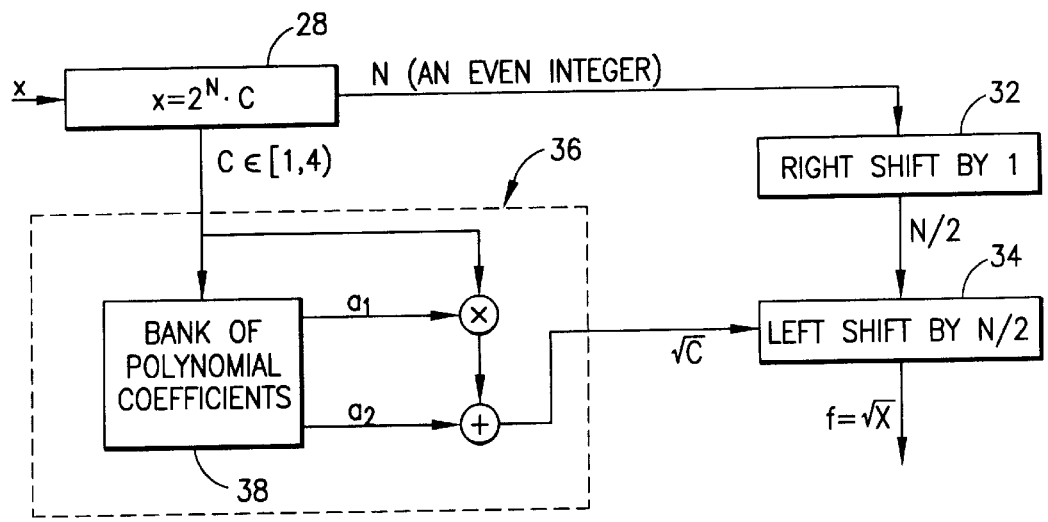

Method 2 for performing envelope detection (an implementation of which is shown in FIG. 4) reduces the polynomial order to 1 without sacrificing performance. In particular, the range of C is divided into a number of subranges prior to the polynomial approximation, and for each subrange a specific polynomial of first order is used to approximate $\sqrt{c}$ (block 36 in FIG. 4). Since the subranges can be predetermined based on the required accuracy, all the polynomial coefficients can be predetermined and stored in a coefficient bank 38. Moreover, because the range of C is small, the number of subranges required is very small and thus the coefficient bank is small.

Methods for Logarithmic Compression

Figure 5:
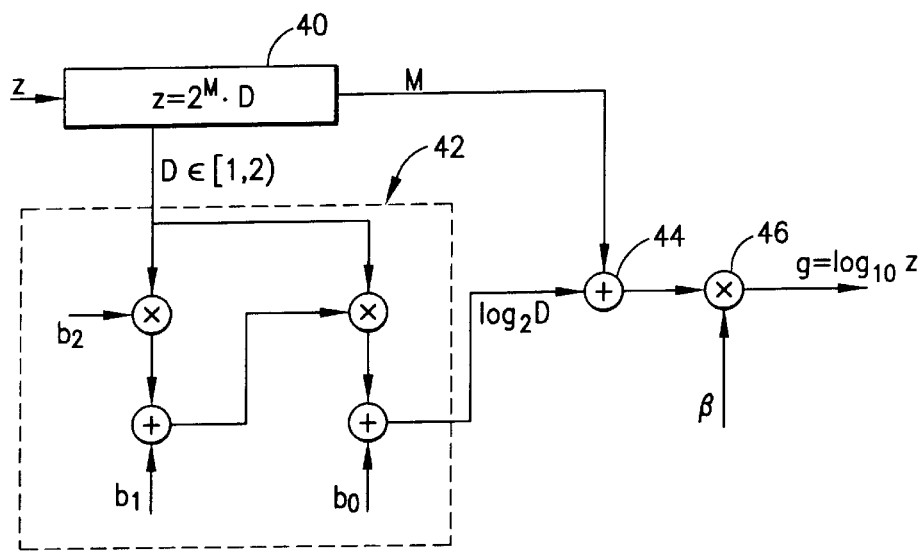
FIGS. 5 and 6 are block diagrams showing respective preferred embodiments of the invention utilizing polynomial approximation in logarithmic compression.

An implementation of a Method 1 for performing logarithmic compression, i.e., for approximating $g = \log_{10} z$, is shown in FIG. 5. In this implementation a polynomial order of 2 is assumed. Method 1 for performing logarithmic compression can be described as follows: (1) express z by $2^M \times D$ (block 40 in FIG. 5), where M is an integer and $1 \leq D < 2$, both M and D being output from block 40 in binary form; (2) with predetermined coefficients $\{b_i\}$ of a polynomial that approximates $\log_2 D$, compute $$g_D = b_0 + b_1 D + \ldots + b_I D^I \quad (14)$$

where I is the order of the polynomial (the dashed box 42 in FIG. 5 represents approximation using a polynomial of order I=2); and (3) form $$g = \beta(M + g_D) \quad (15)$$

employing an adder 44 to form the sum $(M+g_D)$ and a multiplier 46 to form the product $\beta(M+g_D)$. The constant $\beta = \log_{10} 2$, which is for the log-function of base 10. Equation (14) computes $\log_2 D$, and Eq. (15) provides $g = \log_{10} z$ based on $\log_2 D$. Because the range of D is only [1, 2) and $\log_2 D$ behaves very well for $1 \leq D < 2$, a polynomial of order 2 can provide excellent approximation.

Figure 6:
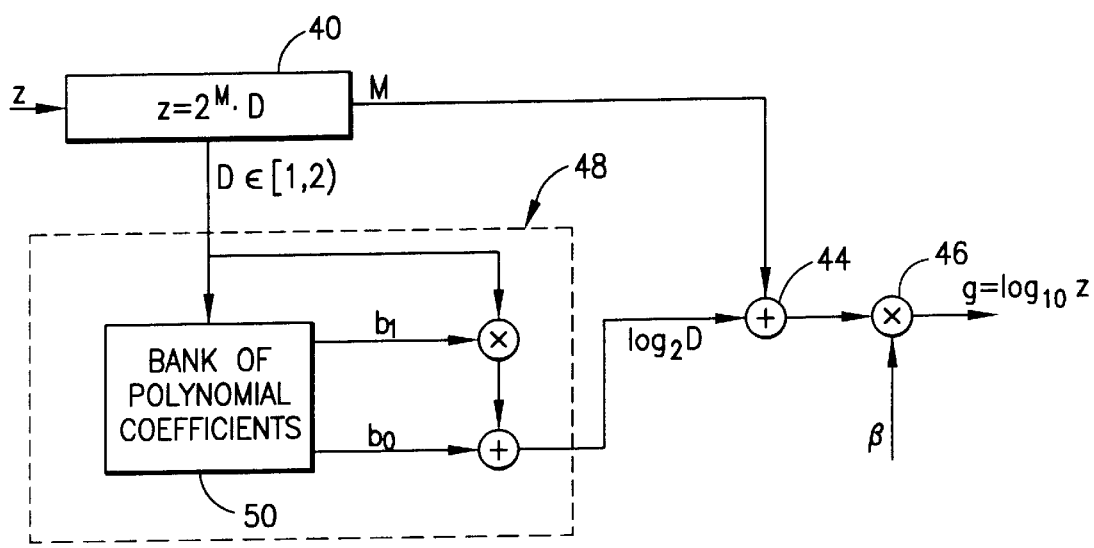

Like Method 2 for envelope detection, Method 2 for logarithmic compression divides the range of D into a small number of subranges prior to the polynomial approximation. An implementation of Method 2 for performing logarithmic compression is shown in FIG. 6. It employs different polynomials of first order to approximate $\log_2 D$ for different subranges of D (block 48 in FIG. 6). Again, all polynomial coefficients are predetermined and stored in a small coefficient bank 50.

Methods for Phase Detection

Figure 7:
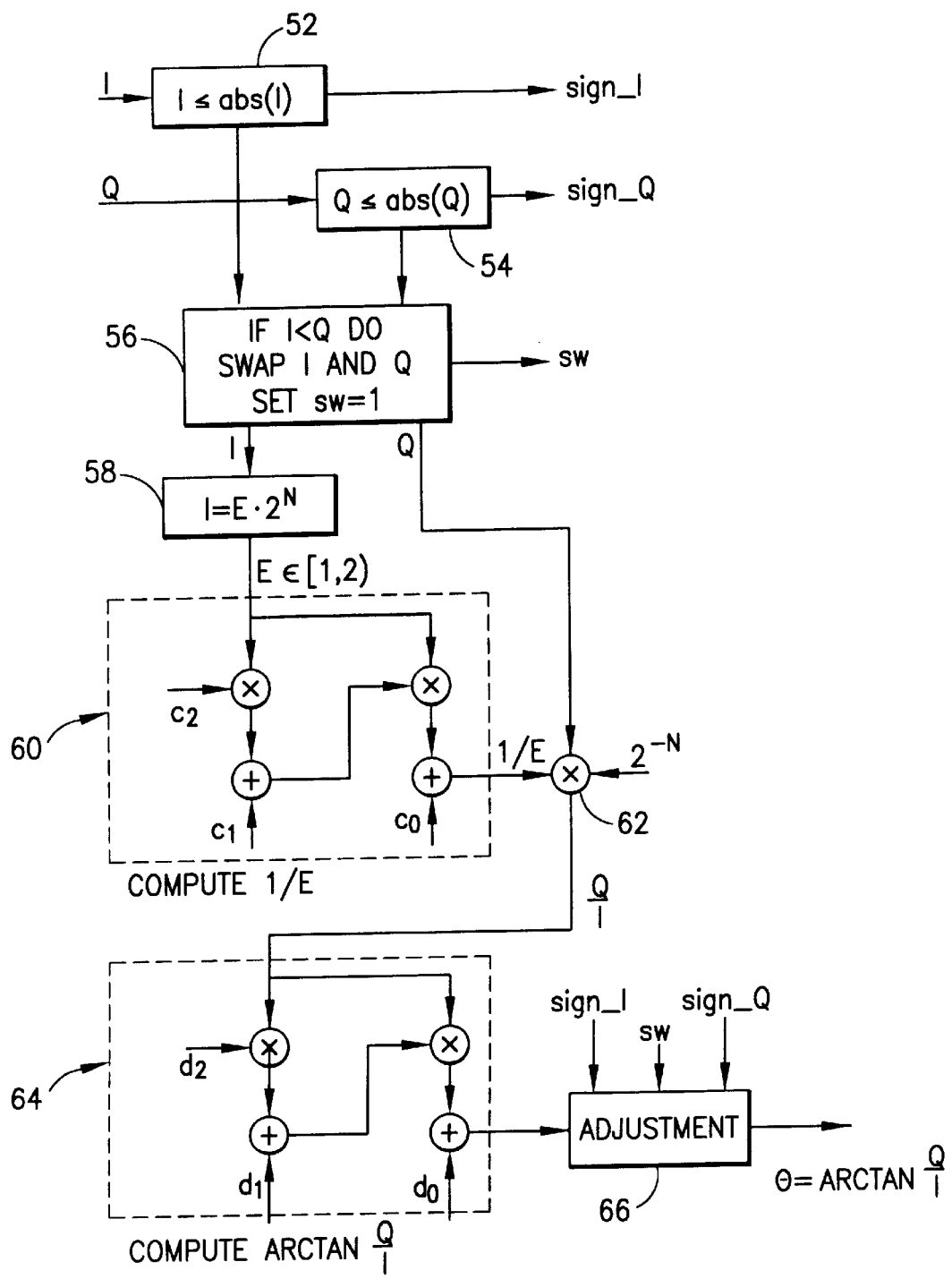
FIGS. 7 and 8 are block diagrams showing respective preferred embodiments of the invention utilizing polynomial approximation in phase detection.

An implementation of a Method 1 for performing phase detection, i.e., for approximating $\theta = \arctan(Q/I)$, is shown in FIG. 7. In this implementation a polynomial order of 2 is assumed. Method 1 for performing phase detection can be described as follows: (1) record the signs of I and Q and then set I and Q to be nonnegative (blocks 52 and 54 in FIG. 7); (2) if I<Q, swap I and Q and record the swapping (block 56 in FIG. 7); (3) express I by $E \times 2^N$, where $1 \leq E < 2$ (block 58 in FIG. 7); (4) with predetermined coefficients $\{c_i\}$ of a polynomial that approximates the reciprocal of E, compute $$1/E = c_0 + c_1 E + \ldots + c_J E^J \quad (16)$$

where J is the order of the polynomial (the dashed box 60 in FIG. 7 represents approximation using a polynomial of order J=2); (5) compute $$\frac{Q}{I} = \frac{1}{E} \times Q \times 2^{-N} \quad (17)$$

employing multiplier 62; (6) with pre-stored coefficients $\{d_i\}$ of a polynomial that approximates $\arctan(Q/I)$, compute $$\theta = d_0 + d_1\left(\frac{Q}{I}\right) + \ldots + d_K\left(\frac{Q}{I}\right)^K \quad (18)$$

(block 64 in FIG. 7) and (7) adjust $\theta$ based on the signs of the original I and Q or if I and Q were swapped (block 66 in FIG. 7). The purpose of swapping I and Q is to limit the range of Q/I to [0, 1]. Because the range of E in Eq. (16) is [1, 2) and the range of Q/I in Eq. (18) is [0, 1] and the associated functions are very smooth over these ranges, polynomials of order 2 or 3 provide excellent approximation.

Figure 8:
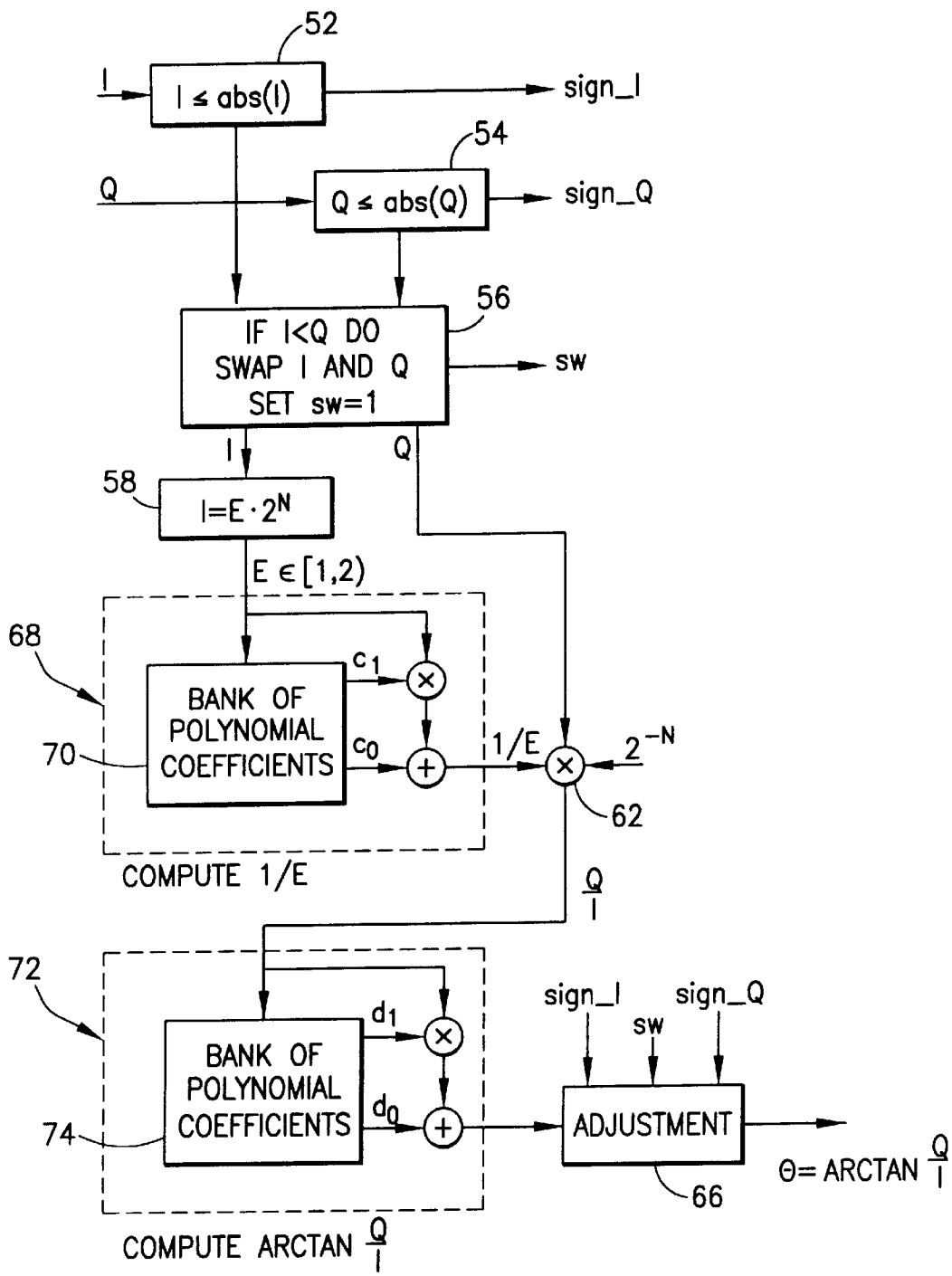

Method 2 for performing phase detection reduces the polynomial order to 1 by dividing the range of E into a small number of subranges and the range of Q/I into a small number of subranges, and different polynomials are used for different subranges. An implementation of Method 2 for performing phase detection is shown in FIG. 8. It employs different polynomials of first order to approximate 1/E for different subranges of E (block 68 in FIG. 8) and different polynomials of first order to approximate $\arctan(Q/I)$ for different subranges of Q/I (block 72 in FIG. 8). The polynomial coefficients are predetermined and stored in respective small coefficient banks 70 and 74.

The foregoing preferred embodiments have been disclosed for the purpose of illustration. Variations and modifications of the concept of the invention will be readily apparent to persons skilled in the art. For example, the ranges of C, D and E do not necessarily have to be the ones described above, although the disclosed ranges may simplify the implementation. Also, the scheme of implementing polynomial computation, indicated by dashed blocks in FIGS. 3–8, is only one possible implementation. Other implementations are possible. In addition, the shift operations shown in FIGS. 3 and 4 may be replaced by other types of operations, e.g., fixed-point multiplications. Although only the pure logarithmic compression is addressed, the associated approach can be readily extended to other types of compressions. Finally, it will be appreciated that the idea of using polynomial approximation in medical ultrasound systems can be extended to other nonlinear operations, such as gray level mapping, parameter extraction and quantitative analysis. All such variations and modifications are intended to be encompassed by the claims set forth hereinafter.

We claim:

1. A system for imaging ultrasound scatterers, comprising:
   an ultrasound transducer array for transmitting an ultrasound beam and detecting ultrasound echoes reflected from ultrasound scatterers at a location in the path of said ultrasound beam;
   means coupled to said ultrasound transducer array for acquiring an imaging data point derived from said ultrasound echoes;
   means for approximating a nonlinear function of said imaging data point using polynomial approximation to form a new data point;
   means for deriving a display value from said new data point; and
   a display monitor for displaying said display value.

2. The system as defined in claim 1, wherein said nonlinear function is envelope detection.

3. The system as defined in claim 1, wherein said nonlinear function is phase detection.

4. The system as defined in claim 1, wherein said nonlinear function is logarithmic compression.

5. The system as defined in claim 1, wherein said approximating means comprise means for expressing said imaging data point by $2^N \times C$, where N is an even integer and $1 \leq C < 4$, and means for approximating $\sqrt{C}$ using a polynomial.

6. The system as defined in claim 1, wherein said approximating means comprise means for expressing said imaging data point by $2^N \times C$, where N is an integer and $1 \leq C < 2$, and means for approximating $\sqrt{C}$ using a polynomial.

7. The system as defined in claim 5, wherein said approximating means comprise means for storing a bank of polynomial coefficients and means for reading out selected polynomial coefficients from said bank, said selected polynomial coefficients being a function of C.

8. The system as defined in claim 1, wherein said approximating means comprise means for expressing said imaging data point by $2^M \times D$, where M is an integer and $1 \leq D < 2$, and means for approximating $\log_2 D$ using a polynomial.

9. The system as defined in claim 8, wherein said approximating means comprise means for storing a bank of polynomial coefficients and means for reading out selected polynomial coefficients from said bank, said selected polynomial coefficients being a function of D.

10. The system as defined in claim 1, wherein said imaging data point has an in-phase component I and a quadrature component Q and said approximating means comprise means for expressing said imaging data point by $2^N \times E$, where N is an integer and $1 \leq E < 2$, first polynomial approximation means for approximating 1/E using a first polynomial, means for computing a product $Q/I=(1/E) \times Q \times 2^{-N}$, and second polynomial approximation means for approximating arctan(Q/I) using a second polynomial.

11. The system as defined in claim 10, wherein said first polynomial approximation means comprise means for storing a first bank of polynomial coefficients and means for reading out a first set of selected polynomial coefficients from said first bank, said first set of selected polynomial coefficients being a function of E.

12. The system as defined in claim 11, wherein said second polynomial approximation means comprise means for storing a second bank of polynomial coefficients and means for reading out a second set of selected polynomial coefficients from said second bank, said second set of selected polynomial coefficients being a function of Q/I.

13. A method for imaging ultrasound scatterers, comprising the steps of:
   transmitting an ultrasound beam;
   detecting ultrasound echoes reflected from ultrasound scatterers at a location in the path of said ultrasound beam;
   acquiring an imaging data point derived from said ultrasound echoes;
   approximating a nonlinear function of said imaging data point using polynomial approximation to form a new data point;
   deriving a display value from said new data point; and
   displaying said display value.

14. The method as defined in claim 13, wherein said nonlinear function is envelope detection.

15. The method as defined in claim 13, wherein said nonlinear function is phase detection.

16. The method as defined in claim 13, wherein said nonlinear function is logarithmic compression.

17. The method as defined in claim 13, wherein said approximating step comprises the steps of expressing said imaging data point by $2^N \times C$, where N is an even integer and $1 \leq C < 4$, and approximating $\sqrt{C}$ using a polynomial.

18. The method as defined in claim 13, wherein said approximating step comprises the steps of expressing said imaging data point by $2^N \times C$, where N is an integer and $1 \leq C < 2$, and approximating $\sqrt{C}$ using a polynomial.

19. The method as defined in claim 13, wherein said approximating step comprises the steps of expressing said imaging data point by $2^M \times D$, where M is an integer and $1 \leq D < 2$, and approximating $\log_2 D$ using a polynomial.

20. The method as defined in claim 13, wherein said imaging data point has an in-phase component I and a quadrature component Q and said approximating step comprises the steps of expressing said imaging data point by $2^N \times E$, where N is an integer and $1 \leq E < 2$, approximating 1/E using a first polynomial, computing a product $Q/I=(1/E) \times Q \times 2^{-N}$, and approximating arctan(Q/I) using a second polynomial.

21. A system for imaging ultrasound scatterers, comprising:
   an ultrasound transducer array for transmitting an ultrasound beam and detecting ultrasound echoes reflected from ultrasound scatterers at a location in the path of said ultrasound beam;
   means coupled to said ultrasound transducer array for acquiring an imaging data point derived from said ultrasound echoes;
   first polynomial approximation means for approximating a nonlinear function of said imaging data point using a first polynomial to form a new data point when said imaging data point lies in a first range;

second polynomial approximation means for approximating said nonlinear function of said imaging data point using a second polynomial different than said first polynomial to form said new data point when said imaging data point lies in a second range;

means for deriving a display value from said new data point; and a display monitor for displaying said display value.

22. An imaging system comprising:

an ultrasound transducer array comprising a multiplicity of elements;

a data acquisition system for controlling said ultrasound transducer array to acquire an imaging data point derived from ultrasound echoes;

a processor programmed to approximate a nonlinear function of said imaging data point using polynomial approximation to form a new data point; and a subsystem for displaying a display value derived from said new data point.

23. The system as recited in claim 22, wherein said nonlinear function is envelope detection.

24. The system as recited in claim 22, wherein said nonlinear function is phase detection.

25. The system as recited in claim 22, wherein said nonlinear function is logarithmic compression.

26. An imaging system comprising:

an ultrasound transducer array comprising a multiplicity of elements;

a display system for displaying a display value; and a computer programmed to perform the following steps:
- (a) controlling said ultrasound transducer array to acquire an imaging data point derived from ultrasound echoes;
- (b) approximating a nonlinear function of said imaging data point using polynomial approximation to form a new data point; and
- (c) controlling said display system to display a display value derived from said new data point.

27. The system as recited in claim 26, wherein said nonlinear function is envelope detection.

28. The system as recited in claim 26, wherein said nonlinear function is phase detection.

29. The system as recited in claim 26, wherein said nonlinear function is logarithmic compression.

* * * * *